United States Patent
Chen et al.

(10) Patent No.: US 9,869,820 B2
(45) Date of Patent: Jan. 16, 2018

(54) OPTICAL PROBE, LIGHT INTENSITY DETECTION, IMAGING METHOD AND SYSTEM

(71) Applicant: Canon U.S.A., Inc., Melville, NY (US)

(72) Inventors: Jeffrey Chen, Winchester, MA (US); Kenji Yamazoe, Tochigi (JP)

(73) Assignee: Canon U.S.A, Inc., Melville, NY (US)

(*) Notice: Subject to any disclaimer, the term of this patent is extended or adjusted under 35 U.S.C. 154(b) by 267 days.

(21) Appl. No.: 14/963,988

(22) Filed: Dec. 9, 2015

(65) Prior Publication Data

US 2017/0167861 A1 Jun. 15, 2017

(51) Int. Cl.
G02B 6/32 (2006.01)
G02B 6/36 (2006.01)

(52) U.S. Cl.
CPC .......... G02B 6/3624 (2013.01); G02B 6/32 (2013.01)

(58) Field of Classification Search
CPC ...... G02B 2027/0138; G02B 2027/014; G02B 2027/0178; G02B 2027/0187; G02B 27/017; G02B 27/0172
USPC .......................................... 33/645
See application file for complete search history.

(56) References Cited

U.S. PATENT DOCUMENTS

| | | | |
|---|---|---|---|
| 4,509,827 A * | 4/1985 | Cowen ................. | G02B 6/3803 356/138 |
| 4,637,683 A * | 1/1987 | Asawa .................. | G02B 6/32 356/138 |
| 5,018,820 A | 5/1991 | Boudreau et al. | |
| 5,163,107 A | 11/1992 | Garriss | |
| 5,299,272 A | 3/1994 | Buchin | |
| 5,459,564 A * | 10/1995 | Chivers ............... | G01B 9/04 356/477 |
| 6,137,930 A | 10/2000 | Laughlin | |
| 6,168,319 B1 | 1/2001 | Francis | |
| 6,236,787 B1 | 5/2001 | Laughlin | |
| 6,341,036 B1 | 1/2002 | Tearney et al. | |
| 6,584,250 B2 | 6/2003 | Lin et al. | |
| 6,748,137 B2 | 6/2004 | Wolak et al. | |
| 7,126,696 B2 | 10/2006 | Tobiason | |
| 7,224,864 B2 | 5/2007 | Burkhard et al. | |
| 7,796,270 B2 | 9/2010 | Yelin et al. | |
| 7,843,572 B2 | 11/2010 | Tearney et al. | |
| 8,145,018 B2 | 3/2012 | Shishkov et al. | |

(Continued)

FOREIGN PATENT DOCUMENTS

WO 2014031748 A1 2/2014

*Primary Examiner* — Yaritza Guadalupe-McCall
(74) *Attorney, Agent, or Firm* — Canon USA Inc., IP Division (57) ABSTRACT

Gradient index lenses, or GRIN lenses, are useful for collimating light from a waveguide and reducing loss when coupling two fibers or coupling the fiber to other optical components. There is provided herein a method to align a GRIN lens to the distal end of an optical fiber with precise lateral alignment. The alignment occurs by: (1) rotating the fiber with respect to the lens so that the fiber is parallel with the lens, such that a light is transmitted through the fiber and then through the lens, and (2) translating the fiber laterally with respect to the lens based on the position of a circle pattern that appears on the screen after the distal end of the lens. The transmitted light is centered in the circle pattern for centered alignment or positioned at calculate distance from the center of the circle pattern for off-axis alignment.

13 Claims, 6 Drawing Sheets

(56) References Cited

U.S. PATENT DOCUMENTS

| | | |
|---|---|---|
| 8,538,208 B2 | 9/2013 | Ho et al. |
| 8,942,530 B2 | 1/2015 | Demers et al. |
| 2002/0033941 A1* | 3/2002 | Seward ................ G01B 11/27 356/153 |
| 2008/0013960 A1 | 1/2008 | Tearney et al. |
| 2011/0275899 A1 | 11/2011 | Tearney et al. |
| 2013/0114924 A1 | 5/2013 | Loh et al. |
| 2014/0034829 A1* | 2/2014 | Crozier ................ H01J 37/226 250/307 |
| 2014/0147078 A1 | 5/2014 | Bhagavatula et al. |
| 2017/0167861 A1* | 6/2017 | Chen ...................... G02B 6/32 |

* cited by examiner

OPTICAL PROBE, LIGHT INTENSITY DETECTION, IMAGING METHOD AND SYSTEM

FIELD OF THE DISCLOSURE

The present disclosure relates to optics. More particularly, the disclosure exemplifies optical probes and optical alignment, such as for aligning an optical fiber to a GRIN lens.

BACKGROUND INFORMATION

Gradient index lenses, or GRIN lenses, are useful for collimating light from a waveguide and reducing loss when coupling two fibers or coupling the fiber to other optical components. To optimize the optical performance of many optical probes including a GRIN lens or a similar lens where the lens must be attached to the distal end of an optical fiber or other optical element with precise lateral alignment. Alignments performed by visual inspection or microscope do not give sufficient precision for some types of probes.

Thus, there is need for a method for aligning a lens such as a GRIN lens to an optical element with precise lateral alignment.

SUMMARY OF EXEMPLARY EMBODIMENTS

According to at least one embodiment of the invention, there is provided an alignment method for alignment of an optical fiber to a lens such as a GRIN lens comprising the steps of: providing a lens having two polished faces, providing an optical fiber having a polished distal face, providing a screen for detection of the light transmitted through the lens, and aligning the fiber to the lens. The alignment occurs by: (1) tipping and tilting the fiber with respect to the lens so that the fiber is parallel with the lens, such that a light is transmitted through the fiber and then through the lens, or (2) translating the fiber laterally with respect to the lens to center the transmitted light within a circle pattern that appears on the screen after the distal end of the lens. The light, which may be nearly collimated light is centered in the circle pattern for centered alignment or positioned at calculate distance from the center of the circle pattern for off-axis alignment.

These and other objects, features, and advantages of the present disclosure will become apparent upon reading the following detailed description of exemplary embodiments of the present disclosure, when taken in conjunction with the appended drawings, and provided claims.

BRIEF DESCRIPTION OF DRAWINGS

Further objects, features and advantages of the present disclosure will become apparent from the following detailed description when taken in conjunction with the accompanying figures showing illustrative embodiments of the present disclosure.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DETAILED DESCRIPTION OF EXEMPLARY EMBODIMENTS

Figure 1:
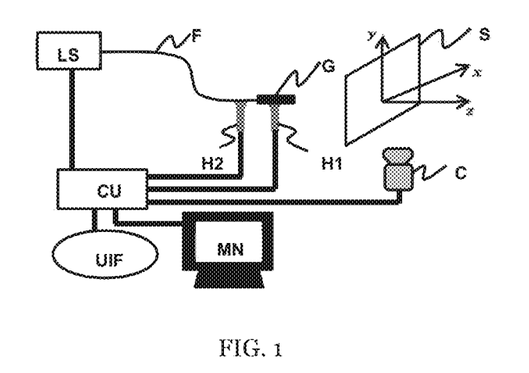
FIG. 1 is a schematic system of GRIN to fiber alignment system.

An exemplary schematic system of GRIN to fiber alignment system is shown in FIG. 1. The light from the light source LS is coupled into the fiber F, which will be attached to the GRIN lens G. The fiber F is held by the holder H2. The GRIN lens is held by the holder H1. Assume that the holders H1 and H2 are supported by mechanical stages. Combination of the movement of the stages realizes up to five-axis movement: x, y, z, $\theta_x$ (rotation about the x-axis), and $\theta_y$ (rotation about the y-axis). These movements may be described as tilting in the xz plane and by tipping in the yz plane.

For example, the holder H2 can be supported by an xyz stage and H1 can be supported by a $\theta_x\theta_y$ stage. A power source for moving and rotating the stage is, for example, an ultrasonic ceramic motor or a micro-stepping stepper motor. The motor may be driven based on a command output from the computer unit CU. Other stages and other means of translating and/or rotating the optical components are also contemplated as part of this invention. The light source LS may be any white light source, a laser, or any other light source with sufficient power where the circle pattern and fan pattern can be directly or indirectly observed.

The light outputs from the GRIN lens G is projected onto the screen S where the light intensity distribution is monitored by the camera C. The camera C, holder H1, and holder H2 is controlled by the computer unit CU which can be operated through the user interface unit UIF. The monitor MN displays the GRIN lens to fiber alignment results. The screen S is provided for detection of the light output of the GRIN lens. The light intensity distribution on the screen may be viewed or may be monitored by a camera C. The screen contains a flat or other shaped that is used to view the light during visualization and may be any known substrate. In some embodiments where the process has at least some automation, the screen is simply the focal plane of a camera C or detector surface, such as a CCD camera.

Figure 9:
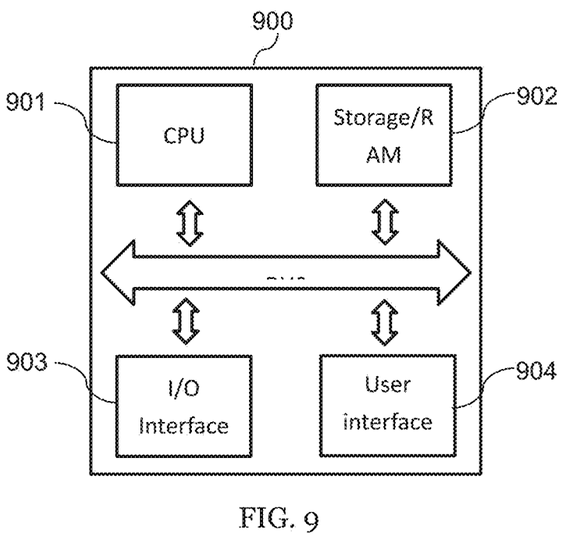
FIG. 9 is a hardware block diagram of computer unit CU.

The details of the computer unit CU is shown in FIG. 9. A Computer system 900 includes CPU 901, Storage/RAM 902, I/O Interface 903 and Monitor interface 904. Also, Computer system 900 may comprises one or more devices. For example, the one computer may include components 901, 902 and 903 and other computer may include component 904.

The CPU 901 is configured to read and perform computer-executable instructions stored in the Storage/RAM 902. The computer-executable instructions may include those for the performance of the methods and/or calculations described herein. For example, CPU 901 calculates the center of the dark ring. Or, CPU 901 calculates various values according to the flowcharts shown in FIG. 6, FIG. 7, FIG. 8 and so on.

Storage/RAM 902 includes one or more computer readable and/or writable media, and may include, for example, a magnetic disc (e.g., a hard disk), an optical disc (e.g., a DVD, a Blu-ray), a magneto-optical disk, semiconductor memory (e.g., a non-volatile memory card, flash memory, a solid state drive, SRAM, DRAM), an EPROM, an EEPROM, etc. Storage/RAM 902 may store computer-readable data and/or computer-executable instructions. Each of components in the computer system 900 communicates with each other via a bus. For example, the video or image data captured by the camera C is stored in the storage/RAM 902 before the video or image is displayed on the monitor MN or when the CPU 901 performs calculations based on the captured video or image.

The I/O interface 903 provides communication interfaces to input and output devices, which may include the holder H1, the holder H2, the camera C, the light source LS, the user interface unit UIF, a microphone and a communication cable and a network (either wired or wireless). The user interface unit UIF may include a keyboard, a mouse, a touch screen, a light pen, a microphone and so on.

The Monitor interface 904 provides communication interfaces to the Monitor MN.

Figure 10A:
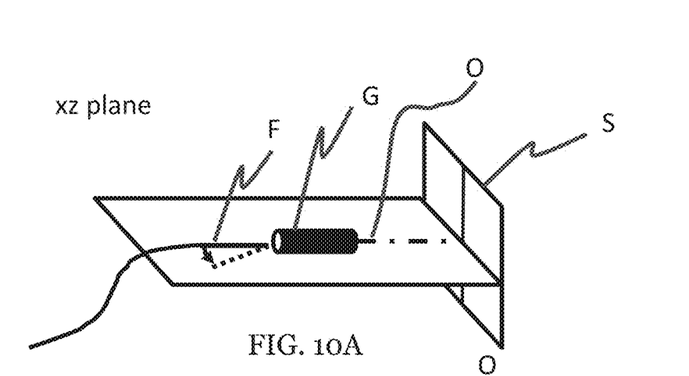
FIGS. 10A and 10B are schematic views showing tilt in the xz plane (FIG. 10A) and tip in the yz plane (FIG. 10B)
Figure 10B:
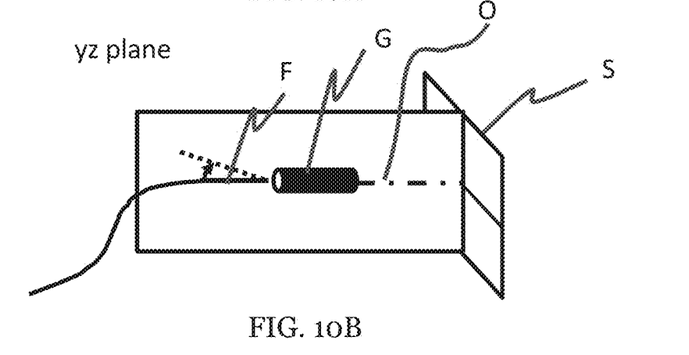

FIGS. 10A and 10B show the tipping and tilting plane of the fiber when the alignment of the fiber F with respect to the GRIN lens G is performed. S is the screen and O is the optical axis of the GRIN lens. Tilting is done in xz plane and expressed as $q_x$. Tipping is done in yz plane and expressed as $q_y$. In other places of this explanation, tilting and tipping may be expressed as rotation of the fiber.

Figure 11:
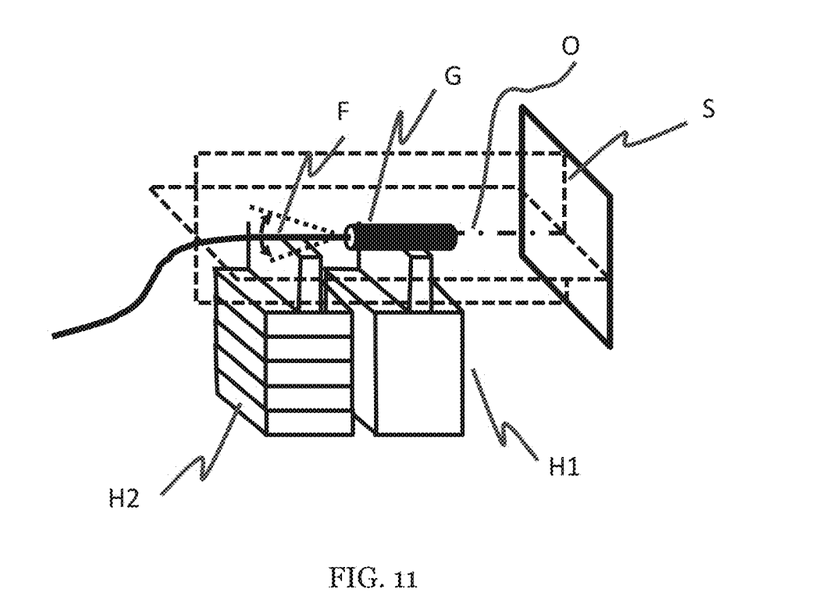
FIG. 11 is a schematic showing the embodiment with stationary GRIN lens and screen and moving fiber.

FIG. 11 shows the schematic of the alignment setup where the GRIN lens G on holder H1 and the screen S are stationary and H2 is a fiber holder with stages. The holder H2 has stages stacked such that tip, tilt and translation in three orthogonal directions are done with the fiber moving with respect to the GRIN lens and the screen. The similar effect may be obtained by fiber being stationary and the GRIN lens being moved by stages. Screen is held stationary in this embodiment with a holder not shown.

Figure 12:
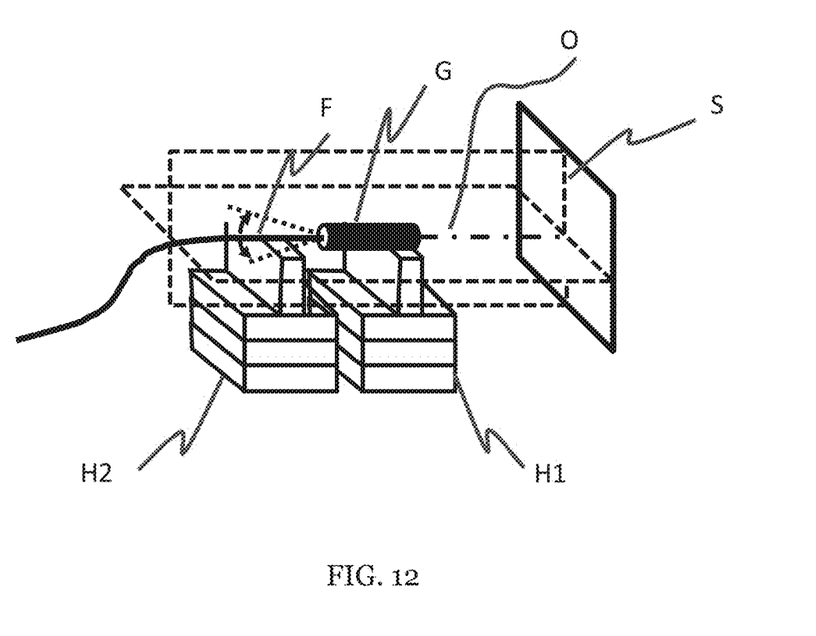
FIG. 12 is a schematic showing the embodiment with stationary screen and moving fiber and moving GRIN lens.

FIG. 12 shows the schematic of the alignment setup where the screen S is stationary and the fiber F and GRIN lens G are moved on stages. This embodiment has GRIN lens G on a holder H1 with translation stages, capable of moving the stages in x, y and z with respect to the screen and fiber. The fiber is held on holder H2 with stages, capable of moving the stages in $q_x$ and $q_y$ in tilt and tip motion with respect to the GRIN lens and the screen. It may also have additional translation stage. Other combinations of the stages may also be possible. Screen is held stationary in this embodiment with a holder not shown. Screen may also be on a stage to capture light beams with larger travel, or larger irradiance pattern, depending on the distance of the screen to the optics.

Screen or CCD may be moved in z direction relative to the light exiting from the GRIN lens to check the collimation of the light transmitted through the lens.

The distance between the GRIN lens and fiber is adjusted in the z direction of the optical axis, such that the beam is at the light from the fiber is transmitted through the GRIN lens and to a calculated position. In some embodiments, the light beam is nearly collimated, such that the beam shows on the screen as a focused spot or as a circular irradiance pattern.

Figure 2:
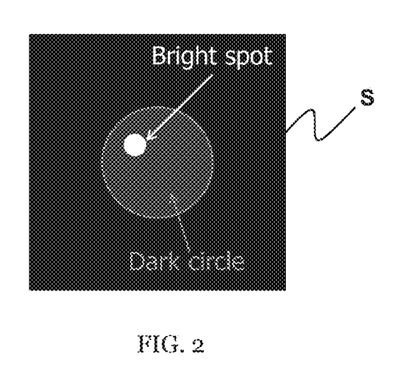
FIG. 2 is schematic view of a light pattern for GRIN lens and fiber alignment.

Assume that the GRIN lens and fiber are angularly adjusted. If the length of the GRIN lens is adjusted such that the output light is nearly collimated or converged, there will be a bright spot on the screen. This result is predictable. However, in the experiment, there appears one more light pattern: very dark circle or ring. The schematic view is illustrated in FIG. 2. The dark circle often has a brighter ring at the rim of the circle. It has been found that the bright spot and dark ring are concentric if the GRIN lens and fiber are laterally aligned. The method presented in this specification takes advantage of the circle pattern and the fact that it remains relatively fixed while the fiber translates.

Figure 3:
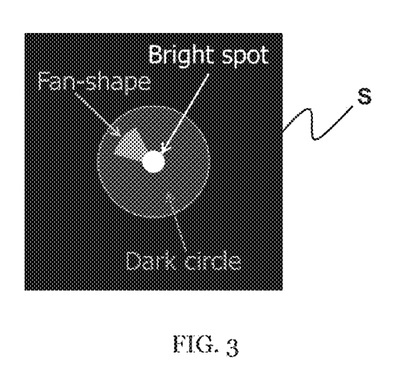
FIG. 3 is schematic view of a light pattern for GRIN lens and fiber alignment when the GRIN lens and fiber are not angularly adjusted.

Next, assume that the GRIN lens and fiber are laterally adjusted. When the light is coupled into the fiber, we see the bright spot concentric to the dark ring. In addition, a fan-shape pattern is observed, as illustrated in FIG. 3. The fan-shape pattern disappears if the GRIN lens and fiber are angularly adjusted. Thus, an aspect of this invention is to align the system until the fan-shape pattern is significantly diminished or made to disappear.

One of the reasons for the dark ring to appear is the surface roughness at the end surface of the GRIN lens. In examples where polishing paper with a grit of 0.3 μm grit or greater, this dark ring should be observed. Thus, the GRIN lens should have polished faces for the methods as described herein. However, the polish preferably has some surface roughness such that the dark ring is observed.

To see the bright spot, the light from the GRIN lens is preferably converging. A pitch of GRIN lens is defined such that a light ray that has propagated one pitch has propagated one cycle of the sinusoidal path trajectory. Let $G_p$ be one pitch of a GRIN lens. To see the bright spot, the length of the GRIN lens $G_1$ should be $(0.20+0.50\ n)G_p \leq G_1 \leq (0.30+0.50\ n)G_p$, where $n \geq 0$.

Embodiment 1

In this exemplarily embodiment, a single-mode fiber was used for the fiber F because the single-mode fiber can form a clear spot if the output light from the fiber is focused. The GRIN lens G has a length of 0.26 $G_p$ in this embodiment. If the fiber is attached to the GRIN lens, the output light is slightly focused to form a bright spot on the screen S. The holder H2 is supported by an xyz stage and H1 is supported by a $\theta_x \theta_y$ stage.

A UV cure transparent epoxy was put on the end of the fiber, which acted as a glue. The light is coupled into the single-mode fiber and is held by the holder H2. GRIN lens is put onto the holder H1.

Thus, the fiber may be moved such that the fiber is within the diameter of the GRIN lens. If the fiber is close enough to the GRIN lens, we can observe a bright spot, dark circle, and perhaps fan-shape pattern on the screen. We may adjust the distance from the GRIN lens to the screen to maximize the contrast of the bright spot. In this exemplary embodiment, the camera C takes a video image of the screen S and the data is sent to the computer unit CU to display the video image on the monitor MN.

Figure 4:
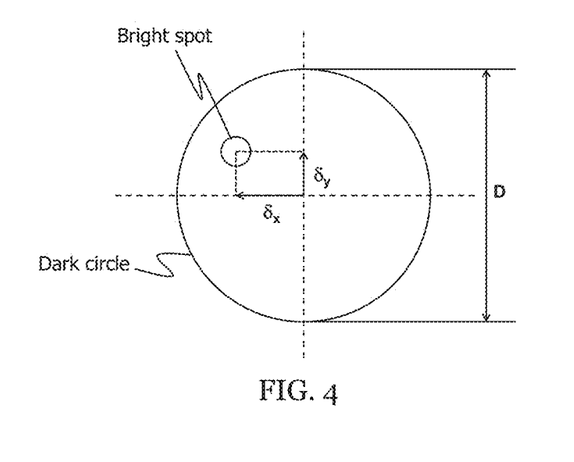
FIG. 4 is a schematic view of a light pattern without considering the fan-shape pattern.

An exemplary alignment method follows: when ignoring the fan-shape pattern, we will observe a pattern as shown in FIG. 4. First, calculate the center of the dark ring, which is set to be the origin. Then, measure the offset of the bright spot: ($\delta_x$, $\delta_y$). If the bright spot and the dark ring are not concentric, the GRIN lens and fiber are not laterally aligned and the alignment process continues.

The diameter of the GRIN lens is defined as $d_G$. The fiber offset can be roughly calculated by ($d_G\delta_x/D$, $d_G\delta_y/D$). This is an approximated equation but the accuracy improved when the offset of the bright spot gets smaller. Therefore, after moving the holder H2 by (wd$_G\delta_x$/D, wd$_G\delta_y$/D) where w is a weigh factor (usually 1), there would be the offset of the bright spot ($\delta'_x$, $\delta'_y$) although $|\delta'_x|<|\delta_x|$ and $|\delta=_y|<|\delta'_y|$. To compensate this offset, it is preferable to move the holder H2 by (wd$_G\delta'_x$/D, wd$_G\delta'_y$/D). If we repeat these offset compensation processes for several times, the bright spot offset becomes negligibly small and the alignment is finished. If the bright spot offset gets larger after several iterations, we may reduce w by, for example, multiplying 0.9 to w and repeat the iteration.

Figure 5:
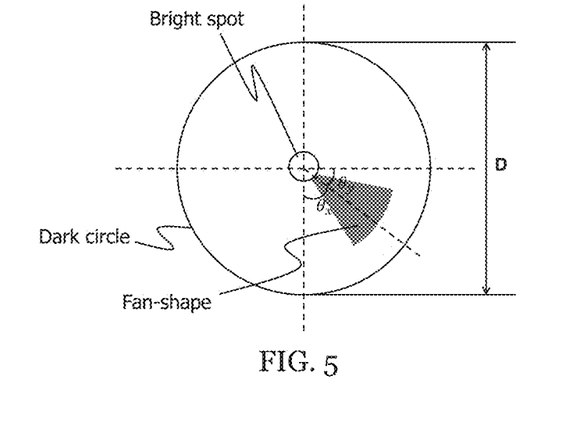
FIG. 5 is a schematic view of a light pattern having the fan-shaped pattern.

When the lateral alignment is finished, a fan-shape pattern may be seen as shown in FIG. 5. A line can be drawn that starts from the origin and divide the fan-shape equally into two and the angle of the line from the x-axis and y-axis be $\varphi_y$ and $\varphi_x$, respectively. The sign convention is shown in FIG. 5. Here we use sgn function which returns the sign of the argument. The $\theta_x$ stage was rotated to $-sgn(\theta_x)$ direction until $\varphi_x \approx 0$. Then, the $\theta_y$ stage was rotated to $-sgn(\varphi_y)$ direction until the fan-shape pattern fades away. If the fan-shape pattern still remains, the rotation of the $\theta_x$ and/or $\theta_y$ stage may be repeated one or more times or until the fan-shape pattern fades away or fades sufficiently for the alignment needs of the particular devise.

If the bright spot is concentric to the dark ring and the fan-shape pattern is absent or very weak, the fiber is defined as being both laterally and angularly aligned. After the alignment is finished, the optical components may be fixed together.

In some embodiments, an epoxy may be added (or may have been added before or during the alignment process). For UV curable epoxy, a UV light used to cure the UV cure epoxy and thus attach the fiber and GRIN lens. Thus, the method as described herein may also include using an epoxy dispenser to dispense epoxy to fix the components together, such as fixing the fiber and lens together when the alignment step is complete. The invention may also include cleaving the fiber(s) with a fiber cleaver.

One aspect of the invention may include knowing which way to move to cancel the bright spot offset and fan-shape pattern. The direction to move the fiber depends on whether round[$2(G_f-0.25G_p)/G_p$] is even or not, where round[ ] rounds the argument. For a bright spot offset defined as ($\iota_x$, $\delta_y$), if round[$2(G_f-0.25G_p)/G_p$] is even as in this Embodiment, the fiber should be moved to the same direction as ($\iota_x$, $\delta_y$). However, if round[$2(G_f-0.25G_p)/G_p$] is odd, the fiber should be moved to the opposite direction to ($\delta_x$, $\delta_y$). Similarly, the rotation direction for angularly adjustment changes according to whether round[$2(G_f-0.25G_p)/G_p$] is even or odd.

Embodiment 2

In this exemplary embodiment, a computer aided system that laterally and angularly align a fiber and a GRIN lens is introduced. The system diagram is shown in FIG. 1. In this embodiment, a single-mode with cladding diameter of 125 µm and a GRIN lens with 350 µm diameter is aligned. The holder H2 is supported by an xyz stage and H1 is supported by a $\theta_x\theta_y$ stage.

The fiber is set to the holder H2. The GRIN lens is held by the holder H1. A UV cure transparent epoxy is put on the end of the fiber, which will work as glue. A user sends a command via the user interface unit UIF to the computer unit CU to start the alignment.

The computer unit CU sends a command to the holders H2 and H1 to move the fiber such that the fiber is within the diameter of the GRIN lens. Furthermore, the fiber is moved to the GRIN lens as close as possible.

The computer unit CU sends a command to the light source LS to couple light to the fiber F. When we observe the bright spot, the dark ring, and perhaps the fan-shape pattern, the alignment procedure starts. The alignment procedure is explained in the flowchart shown in FIG. 6.

Figure 6:
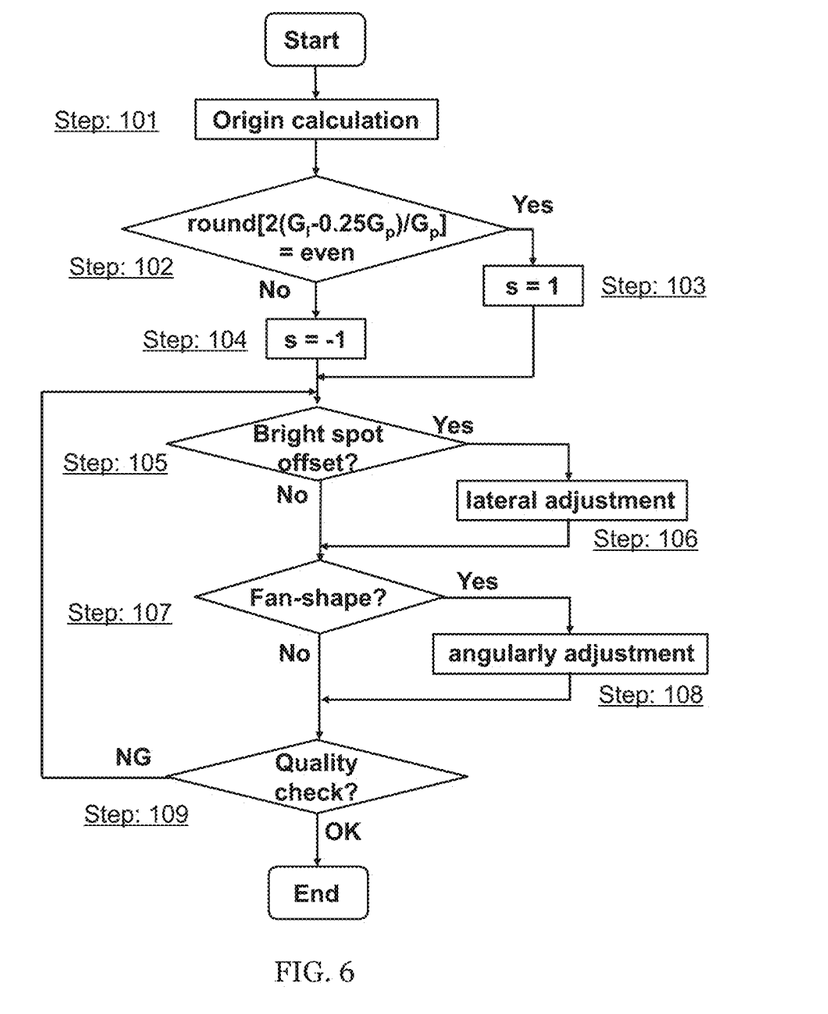
FIG. 6 is flowchart showing an exemplary alignment procedure.

In Step 101, the computer unit CU calculates the center of the dark ring and sets the center as the origin of the screen S. In Step 102, the computer unit CU judges if round[$2(G_f-0.25G_p)/G_p$] is even number or not. For example, if $G_f=0.26$ $G_p$, round[$2(G_f-0.25G_p)/G_p$]=0 (even). If round[$2(G_f-0.25G_p)/G_p$] is even, the computer unit CU sets a variable s to 1 in Step 103; otherwise the computer unit CU sets a variable s to −1 in Step 104.

In Step 105, the computer unit CU detects the bright spot offset. To calculate the bright spot center, one useful way is to use the center of the gravity of the bright spot. If the bright spot offset is less than predetermined threshold, the computer unit CU proceeds to Step 107; otherwise the computer unit CU proceeds to Step 106. In Step 106, the lateral alignment is done by moving the fiber F such that the bright spot and the dark ring become concentric. The detail of Step 106 will be explained later.

In Step 107, the computer unit CU detects the fan-shape pattern, the computer unit CD proceeds to Step 108; otherwise the computer unit CU proceeds to Step 109.

In Step 109, the computer unit CU checks the quality of the alignment. The computer unit CU evaluates the quality by the bright spot offset and the fan-shape pattern appearance. If the bright spot offset is negligible and the fan-shape pattern is faded away, the computer unit CU finishes the alignment process; otherwise, the computer unit CU goes back to Step 105.

Figure 7:
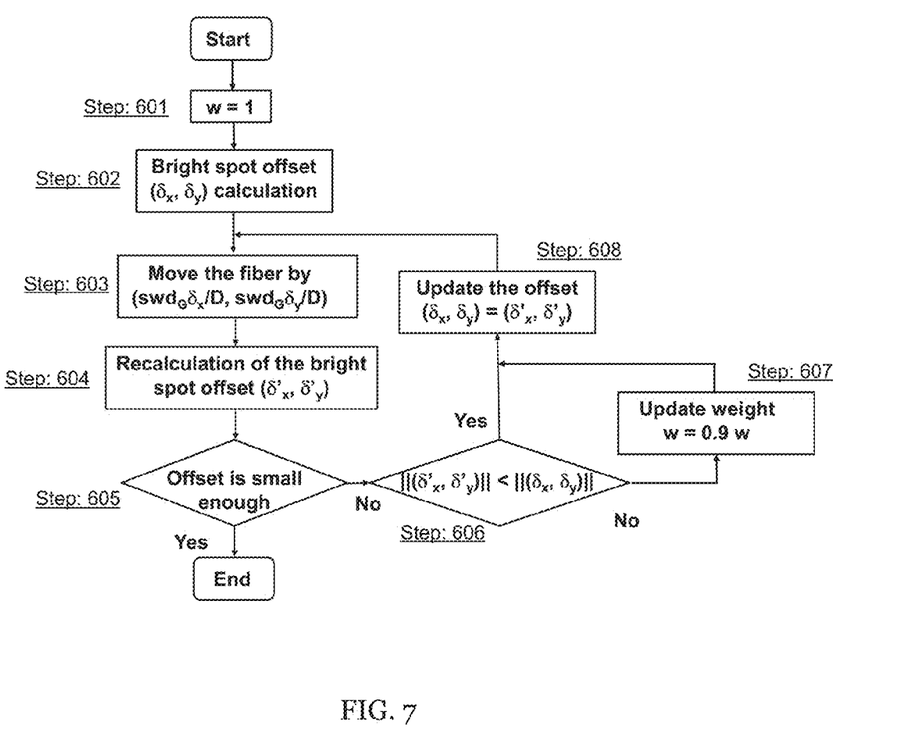
FIG. 7 is a flowchart showing the detail of Step 106 in an exemplary alignment procedure.

The detail of Step 106 is explained in detail in FIG. 7. Step 106 of this exemplary method begins with Step 601, in which the weigh factor w is set to 1. In Step 602, the computer unit CU analyzes the video image of the screen to calculate the bright spot center ($\delta_x$, $\delta_y$). The center of the gravity of the spot gives a good approximation of the center position. In Step 603, the computer sends a command to the holder which has xy stage to move the fiber by (swd$_G\delta_x$/D, swd$_G\delta_y$/D). In Step 604, the computer unit CU analyzes the video image of the screen again to recalculate the bright spot center ($\delta'_x$, $\delta'_y$).

In Step 605, the computer unit CU judges if the offset ($\delta'_x$, $\delta'_y$) is smaller than a predetermined value. If yes, the computer unit CU finishes the alignment process. If no, the computer unit CU goes to Step 606. In Step 606, the computer unit CU judges if ($\delta'_x$, $\delta'_y$) is closer to ($\delta_x$, $\delta_y$). If yes, the computer unit CU proceeds to Step 608; otherwise to Step 607.

In Step 607, the computer unit CU updates the weigh factor by multiplying the weigh factor by 0.9. In Step 608, the computer unit CU updates the bright spot offset by regarding ($\delta'_x$, $\delta'_y$) is the offset and returns to Step 603.

Figure 8:
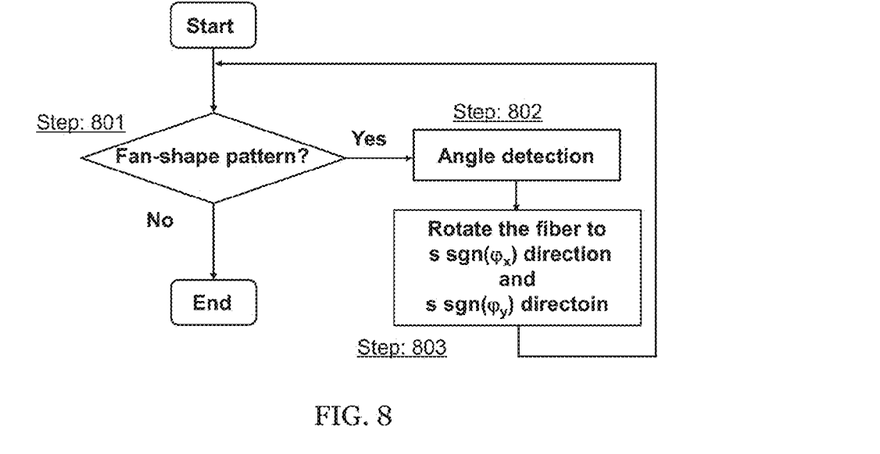
FIG. 8 is a flowchart showing the detail of Step 108 in an exemplary alignment procedure.

Exemplary detailed components within Step 108 are described in FIG. 8. In Step 108, angularly adjustment is performed by starting with Step 801, in which the computer unit CU searches the fan-shape pattern. If the fan-shape pattern is detected, the computer unit CU proceeds to Step 802; otherwise the computer unit CU finishes the process. In Step 802, the computer unit CU draws a line that starts from the origin and divide the fan-shape equally into two. The computer unit CU measures the angles of the line from the x-axis and y-axis, which are stored as $\varphi_y$ and $\varphi_x$, respectively.

In Step 803, the computer unit CU sends a command to rotate the $\theta_x$ stage to $-s\ \text{sgn}(\varphi_x)$ direction until $\varphi_x \approx 0$. Then, the computer unit CU sends a command to rotate the $\theta_y$ stage to $-s\ \text{sgn}(\varphi_y)$ direction until the fan-shape pattern is faded. As $\varphi_x$ is not perfectly 0, the fan-shape pattern may still remain. Therefore, the next step is to go back to Step 801 and iterate as shown.

In some embodiments, one or more of the steps in FIG. 6 may be performed manually. For example, the adjustment steps 106 and 108 steps may be performed manually. Similarly, determining whether there is a bright spot offset (step 105) and/or determining whether there is a fan shape (step 107) may be determined by direct visualization and the adjustments (106 or 108) made accordingly (either automatically by the CU or manually).

In other embodiments, different alignment processes within the scope of the present invention are also contemplated. For example, the GRIN lens may be fixed and only the fiber may be moved. In this embodiment, no translational stage is necessary for the GRIN lens and, in some instances, both an xyz stage and a $\theta_x\theta_y$ stage can be attached to the component holding the fiber. In other embodiments, the fiber may be fixed and the GRIN lens may be moved. In this embodiment, no translational stage is necessary for the fiber and, in some instances, both an xyz stage and a $\theta_x\theta_y$ stage can be attached to the component holding the GRIN. In other embodiments, the screen may be movable (either an xyz stage and/or a $\theta_x\theta_y$ stage) and one of the lens and the fiber is movable and the other is fixed. In some embodiments, each of the lens, fiber, and screen are movable. In yet other embodiments, a movable elements (lens, fiber, or screen) may be movable, but have fewer degrees of freedom (e.g., an xy translational stage, but no movement in the X axis, or an xy translational stage and a $\theta_x\theta_y$ stage on one element and a z axis translation for one or more of the other elements.

In some embodiments, the adjustment of the stage is manual. Manual knobs may be used to adjust the position of the stage. Alternatively, the invention may also include a control panel to manually adjust xyz and theta positions of one or more of the elements. In other embodiments, the adjustment of the stage is automatically controlled by the computer unit CU.

As described in the embodiments, alignment between an optical fiber and a GRIN lens is demonstrated. In some embodiments, the fiber is a single mode fiber. In other embodiments, the fiber is a multi-mode fiber. This invention also contemplates alignment using an optical fiber bundles and other waveguides.

Additionally, lenses that are not GRIN lenses may also be aligned by the process as described above should the lens provide the same dark circle and/or fan-shaped pattern as described above. The embodiments depict herein demonstrate an alignment of a 350 μm GRIN lens, however, the diameter and length of the lens may be different.

In some embodiments, the screen is a CCD. In some embodiments, an additional lens is added before the CCD. The CCD may be fixed or it may be attached to one or more translational stages or other movement means. In some embodiments, the CCD camera is moved in the x and y planes to observe alignment. In some embodiments, a monitor is used to view the pattern of the rings and fan on the CCD.

In referring to the description, specific details are set forth in order to provide a thorough understanding of the examples disclosed. In other instances, well-known methods, procedures, components and circuits have not been described in detail as not to unnecessarily lengthen the present disclosure.

It should be understood that if an element or part is referred herein as being "on", "against", "connected to", or "coupled to" another element or part, then it can be directly on, against, connected or coupled to the other element or part, or intervening elements or parts may be present. In contrast, if an element is referred to as being "directly on", "directly connected to", or "directly coupled to" another element or part, then there are no intervening elements or parts present. When used, term "and/or", includes any and all combinations of one or more of the associated listed items, if so provided.

Spatially relative terms, such as "proximal", "distal", and the like, may be used herein for ease of description to describe one element or feature's relationship to another element(s) or feature(s) as illustrated in the various figures. It should be understood, however, that the spatially relative terms are intended to encompass different orientations of the device in use or operation in addition to the orientation depicted in the figures. For example, the relative spatial terms "proximal" and "distal" may be interchangeable, where applicable.

The terminology used herein is for the purpose of describing particular embodiments only and is not intended to be limiting. As used herein, the singular forms "a", "an", and "the", are intended to include the plural forms as well, unless the context clearly indicates otherwise. It should be further understood that the terms "includes" and/or "including", when used in the present specification, specify the presence of stated features, integers, steps, operations, elements, and/or components, but do not preclude the presence or addition of one or more other features, integers, steps, operations, elements, components, and/or groups thereof not explicitly stated.

Various parameter disclosed herein are as follows:
$n_0$=refractive index of optical axis of GRIN lens
$n_1$=refractive index of proximal boundary (fiber)
$n_2$=refractive index of distal boundary (air)
z=mechanical length of GRIN lens
$\sqrt{A}$=gradient constant
$r_1$=initial offset with respect to the optical axis of the GRIN lens
$r^*_1$=initial incident angle with the GRIN lens
$r_2$=final offset with respect to the optical axis of the GRIN lens
$r^*_2$=final offset with respect to the optical axis of the GRIN lens In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

What is claimed is:

1. A method for alignment of an optical fiber to a lens comprising the steps of:
    providing a lens having two polished faces,
    providing an optical fiber having a polished distal face,
    providing a screen positioned for detection of the light transmitted through the lens,
    aligning the fiber to the lens by: (1) tipping and tilting the fiber with respect to the lens so that the fiber is parallel with the lens, such that a light is transmitted through the fiber and then through the lens, and (2) translating the fiber laterally with respect to the lens to center the transmitted light within a circle pattern that appears on the screen after the distal end of the lens.

2. The method of claim 1, wherein the lens is a gradient index (GRIN) lens.

3. The method of claim 1, wherein at least one of the lens or the optical fiber is secured to at least one stage configured for moving in a lateral direction and at least one of the lens or the optical fiber is secured to at least one stage configured for moving in the direction of optical axis.

4. The method of claim 1, further comprising tilting and tipping the fiber with respect to the lens such that the transmitted light moves to a calculated position.

5. The method of claim 1, wherein the rotating of the fiber with respect to the lens comprises one of:
    moving the fiber and/or moving the screen where the lens is fixed,
    moving the lens and/or moving the fibers where the screen is fixed, or
    moving the lens and/or moving the screen, where the fiber is fixed.

6. The method of claim 1, wherein the translating of the fiber with respect to the lens comprises one of:
    moving the fiber and/or moving the screen where the lens is fixed,
    moving the lens and/or moving the fibers where the screen is fixed, or
    moving the lens and/or moving the screen, where the fiber is fixed.

7. The method of claim 3, wherein the stage is moved by an automated adjustment mechanism.

8. The method of claim 1, wherein the fiber is a single mode fiber.

9. The method of claim 1, wherein the fiber is a multi-mode fiber.

10. The method of claim 1, wherein the screen is a charged coupled device (CCD).

11. The method of claim 10, wherein the method further comprises observing an image of the circle pattern on a monitor in communication with the CCD.

12. The method of claim 1, further comprising using a control panel to rotate and translate at least one of the fiber, lens, and screen in the X, Y, Z, and theta directions.

13. A method for alignment of an optical fiber to a lens comprising the steps of:
    providing a lens having two polished faces,
    providing an optical fiber having a polished distal face,
    providing a screen for detection of the light transmitted through the lens,
    aligning the fiber to the lens by: (1) tipping and tilting the fiber with respect to the lens so that the fiber is parallel with the lens, such that a light is transmitted through the fiber and then through the lens, and (2) translating the fiber laterally with respect to the lens based on the position of a circle pattern that appears on the screen after the distal end of the lens when the transmitted light is
    centered in the circle pattern, or
    positioned at calculate distance from the center of the circle pattern.

* * * * *